United States Patent [19]

Elser et al.

[11] Patent Number: 4,582,730

[45] Date of Patent: Apr. 15, 1986

[54] METHOD FOR PRIMING ABSORBENT SUBSTRATES

[75] Inventors: Wilhelm Elser, Griesheim; Peter Rossberg; Michael Wicke, Seeheim-Jugenheim, all of Fed. Rep. of Germany

[73] Assignee: Röhm GmbH, Darmstadt, Fed. Rep. of Germany

[21] Appl. No.: 695,302

[22] Filed: Jan. 28, 1985

[30] Foreign Application Priority Data

Feb. 11, 1984 [DE] Fed. Rep. of Germany ....... 3404951

[51] Int. Cl.[4] .............................................. B05D 3/02
[52] U.S. Cl. .................. 427/393; 427/393.6; 427/408
[58] Field of Search ............... 427/393, 393.6, 408; 524/80, 81, 388

[56] References Cited

U.S. PATENT DOCUMENTS 3,926,898 12/1975 Choi et al. ................. 427/408 X
4,220,679 9/1980 Backhouse ....................... 427/401
4,417,013 11/1983 Schuster ............................ 524/87

OTHER PUBLICATIONS

Chem. Abstr. 94, 5005f.
Chem. Abstr. 94, 67427d.
Chem. Abstr. 97, 12961t.
Chem. Abstr. 92, 112366e.
Chem. Abstr. 93, 96934b.

Primary Examiner—Thurman K. Page
Attorney, Agent, or Firm—Curtis, Morris & Safford

[57] ABSTRACT

A method for priming an absorbent mineral or wood substrate to provide a wet-adhering coating, which comprises applying to said substrate a solution, in an organic solvent which has a normal boiling point between 50° C. and 180° C., of a copolymer of monomers of acrylate and methacrylate esters, of styrene and of vinyl esters, and of dialkylaminoalkyl esters of acrylic acid and of methacrylic acid and their corresponding amides, the maximum glass transition temperature of the copolymer being in the range from 20° C. to 80° C. and the reduced viscosity of the copolymer being in the range from 20 to 60 ml/g.

12 Claims, No Drawings

METHOD FOR PRIMING ABSORBENT SUBSTRATES

The present invention relates to a method for priming an absorbent mineral or wood substrate to provide a wet-adhering coating.

The coating of mineral substrates and of wood with surface coatings has been practiced for a long time.

The once widely used oil based paints have largely given way to latex paints. Exterior paint formulations for use on mineral substrates mainly employ polyvinyl acetate and copolymers of vinyl acetate with maleic acid esters, ethylene, or vinyl chloride; polymers of vinyl propionate or copolymers thereof with acrylic acid esters or methacrylic acid esters or with vinyl chloride; polyacrylates or polymethacrylates; copolymers of styrene with acrylic acid esters or methacrylic acid esters; and copolymers of styrene with butadiene. For wood, latex coatings comprising acrylic resins have already made some inroads, although alkyd coating systems continue to be used on a large scale.

Latex paints are generally regarded as adhering relatively well to substrates. (See Ullmanns Enzyklopaedie der technischen Chemie, 4th ed., vol. 15, pp. 665–668, Verlag Chemie.) In actual use, however, difficulties are encountered which have to do with the condition of the substrate.

So far as the durability of coatings is concerned, wet adhesion plays an extremely important role. Wet adhesion often leaves much to be desired when latex paints are used, especially on porous substrates. This is why coating systems have come into use which call for the application of a primer before the latex paint is applied. Up to now these primers have been mainly organic solutions of homopolymers, and particularly of copolymers, of vinyl acetate, or solutions of acrylic resins, but of late aqueous dispersions of extremely finely divided synthetic resins, for example, acrylic resins, have also been gaining acceptance. There seemed to be no reason to believe that wet adhesion, in the sense of early resistance to water upon exposure to rain, or freedom from bubbles when subjected to the action of moisture from under the coating, might be enhanced by increasing the hydrophilicity of the binders of appropriate primers. It is not surprising, therefore, that relatively hydrophilic comonomers such as the esters of acrylic acid or of methacrylic acid which contain amino groups have not gained acceptance in the manufacture of resin solutions to be used as primers for the purpose described.

Japanese patent publication 80-99,983 (Chem. Abstr. 94, 5005f) recommends a coating system in which copolymers of polymerizable OH-active groups and acrylate esters or methacrylate esters are reacted with polyisocyanates and the reaction product is appllied as a primer to concrete. A polyurethane coating is then applied on top of that. Acrylate prepolymers likewise modified with isocyanates are suggested in Japanese patent publication No. 80-125,176 (Chem. Abstr. 94, 67427d) for use as primers in the coating of concrete.

By way of example, 30 parts of butyl acrylate, 70 parts of methyl methacrylate, and 14.1 parts of 2-(tert-butylamino)ethyl methacrylate are polymerized in toluene in the presence of 2-aminoethanethiol and heated with 25.2 parts of diphenylmethane diisocyanate and 0.1 part of stannous octoate, diluted with ethyl acetate, and coated onto concrete. Polyurethane rubber is then applied as a top coat.

Water thinned coatings for use as primers for cement construction materials are the subject matter of Japanese patent publication No. 82-65,762 (Chem. Abstr. 97, 129261t). For example, a solution of a copolymer of butyl acrylate, diethylaminoethyl methacrylate, and methyl methacrylate is neutralized with formic acid and brought to a solids content of 15 percent with water. The material to be coated is immersed in that solution for about an hour.

Japanese patent publication No. 79-116,021 (Chem. Abstr. 92, 112366e) relates to the coating of concrete with cationic dispersions of copolymers, with or without amino groups, as primers and with an acrylic resin surface coating. In an example, an aqueous system of a copolymer of 60 parts of 2-ethylhexyl acrylate, 40 parts of methyl methacrylate, 3 parts of 2-(dimethylamino)ethyl methacrylate, and octadecyltrimethylammonium chloride is used as primer, on top of which an acrylic resin emulsion is applied. Nothing is said in that publication about the use of colorants.

According to Japanese patent publication No. 80-39,239 (Chem. Abstr. 93, 96934b), wood as a substrate is pretreated with a mixture of aliphatic diamines, glycidyl esters of unsaturated acids, and free-radical initiators and then coated with a polyurethane or alkyd resin.

The object underlying the present invention relates in particular to penetrating primers and latex paints or varnishes to be applied to absorbent substrates. Past experience has shown that the penetrating primers used up to now, comprising polyvinyl acetate for example, do not fully satisfy practical requirements, especially with respect to their wet adhesion. The usual complaint is insufficient early water resistance upon exposure to rain. When subjected to the action of moisture from underneath the coat, there is no assurance of the absolutely necessary freedom from bubbles.

This problem is encountered especially in connection with absorbent substrates of a mineral nature such as are used in the building sector, for example stone, masonry, plaster, concrete, cement, materials containing asbestos cement, mineral fiber cement or other cement bound fibers, brick and gypsum, as well as wood. With nonabsorbent substrates such as metals and most plastics, the conditions are quite different.

There has been a need for wet adhering coating systems possessing early water resistance which are suitable for the coating of absorbent substrates of materials of a mineral nature or of wood.

To fill this need, a method is now proposed in which there is applied to an absorbent substrate a primer consisting of a solution of a copolymer of (1) at least one monomer of the formula

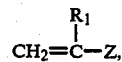

wherein $R_1$ is hydrogen or methyl and Z is

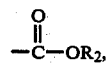

wherein $R_2$ is linear or branched alkyl having from 1 to 10 carbon atoms, or cyclic alkyl having 5 to 10 carbon atoms, or z is phenyl or phenyl substituted with alkyl radicals having from 1 to 4 carbon atoms, or Z is

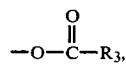

wherein $R_3$ is alkyl having from 1 to 8 carbon atoms; and (2) 0.5 to 20 percent, by weight of the total copolymer, of at least one monomer of the formula

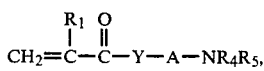

wherein $R_1$ is again hydrogen or methyl, Y is oxygen or $-NR_6-$ wherein $R_6$ is hydrogen or alkyl having from 1 to 6 carbon atoms, A is linear or branched aliphatic hydrocarbon having from 2 to 10 carbon atoms, and $R_4$ and $R_5$ taken alone are independently alkyl having from 1 to 6 carbon atoms or, taken together with the nitrogen atom, form a five- or six-membered heterocyclic ring or such a ring which may contain further nitrogen or oxygen atoms, the maximum glass transition temperature of the copolymer being in the range from 20° C. to 80° C. and the reduced viscosity of the copolymer being in the range from 20 to 60 ml/g. The solution further contains from 0 to 15 percent, by weight of the solution, of a pigment or organic dye. The solvent is an organic solvent, the boiling point of which under normal conditions is between 50° C. and 180° C. The copolymer is from 5 to 30 weight percent of the solution. After drying, conventional aqueous latex paints or varnishes are applied on top of the primer.

The absorbent substrates in question are, as mentioned earlier, substrates of a material of a mineral nature (for example, stone, masonry, brick, plaster, concrete, cement, asbestos cement, mineral fiber cement, other fibrous materials, or gypsum) or of wood.

As a rule, the solution of polymers should be applied at a rate from 2 to 15 g, and preferably of from 2 to 10 g, of copolymer per square meter of substrate. However, care should be taken that no surface film of the polymer forms after the polymer solution has been applied. The resin solutions used in accordance with the invention penetrate deeply into the substrates treated.

The copolymers can be prepared conventionally by free radical polymerization of the monomers of the aforementioned formulas.

As a rule, the monomers (1) should represent from 80 to 99.5 percent by weight of the total copolymer. The latter may be formed of several monomers of the formula shown above, in which case the maximum glass transition temperatures specified must be observed. Of particular importance as monomer of this type is methyl methacrylate. Esters of methacrylic acid with $C_2-C_8$ alcohols and esters of acrylic acid with $C_1-C_8$ alcohols are also highly suitable. The esters of acrylic or methacrylic acid with ethanol, n-propanol and isopropanol, n-butanol and isobutanol, hexyl alcohol, cyclohexyl alcohol and ethylhexyl alcohol, and particularly n-butyl acrylate and methacrylate are also suitable.

Moreover, styrene and its alkylated derivatives, for example alpha-methylstyrene and para-methylstyrene, as well as vinyl esters of fatty acids, and particularly vinyl acetate and vinyl propionate, are suitable for use.

The monomers (2) are preferably dialkylaminoakyl acrylates and methacrylates. Illustrative of these are 2-dimethylaminoethyl- and 2-diethylaminoethyl-acrylate or -methacrylate, 2-dimethylaminopropyl- and 2-diethylaminopropyl-acrylate or -methacrylate, 2-tert-butylaminoethyl-acrylate or -methacrylate, and the 3-dialkylamino-2,2-dimethylpropyl-1 acrylates and -methacrylates, particularly the 3-dimethylamino- and 3-diethylamino-compounds, and the amides corresponding to the compounds named (with $Y=-NR_6-$, wherein $R_6$ is hydrogen, methyl, or ethyl). Moreover, morpholinoethyl acrylate and methacrylate and the corresponding amides are of interest. Quaternary copolymers of methyl methacrylate, n-butyl acrylate, n-butyl methacrylate, and 3-dialkylamino-2,2-dimethylpropyl-1-acrylates or -methacrylates, for example in a weight ratio of about $30\pm5:25\pm5:37\pm6:8\pm2$, are of particular interest.

The maximum glass transition temperatures are determined in conformity with DIN 53445 and DIN 7724 and the reduced viscosities in conformity with DIN 1342, DIN 51562, and DIN 7745 (see Houben-Weyl, vol. 14/1, pp. 81-84, Georg Thieme Verlag, Stuttgart, 1961). Reduced viscosities of the copolymer below 20 usually indicate diminished adhesion due to the action of water.

The solvents, the boiling points of which under normal conditions (760 mm Hg) are between 50° C. and 180° C., which are suitable for the preparation of the solutions are preferably oxygen-containing solvents from the group formed by the esters, ethers, and ketones, for example, or are aromatic solvents or solvents containing aromatics. Illustrative of these are, in particular, ethyl acetate and butyl acetate.

The main purpose of adding pigments or organic dyes to the solution is to permit the primed surface to be distinguished from one that has not been primed. Thus there is an almost unlimited selection of suitable pigments and/or organic dyes. Example of these are Phthalocyanine Blue and Phthalocyanine Green.

However, the addition of the above colorants may be dispensed with altogether without detracting from the effectiveness of the invention.

If desired, more than one coat of the solution may be applied to a substrate.

The Examples which follow will serve to illustrate the production of the penetrating primer.

EXAMPLE 1

460 g of ethyl acetate (degassed with 4 g of dry ice) are introduced into a Witt jar equipped with a horseshoe agitator with scraper blades, a thermometer, and a reflux condenser, and are heated. At 77° C., 0.64 g of tert-butyl peroctoate in 10 g of ethyl acetate is added and the addition of a mixture of 99.2 g of methyl methacrylate, 80 g of butyl acrylate, 116.5 g of butyl methacrylate, 24.3 g of 3-dimethylamino-2,2-dimethylpropyl-1 methacrylate, 3.2 g of tert-butyl peroctoate, and 0.16 g of 2-mercaptoethanol is started.

This addition is made over 2 hours. On completion of the addition, another 0.64 g of tert-butyl peroctoate in 10 g of ethyl acetate is added and the base temperature is held at 80° C. for another 8 hours. A clear, yellowish solution is obtained. Solids content, about 40%; Brookfield viscosity, about 700 mPa.sec; reduced viscosity in acetone, about 33 ml/g; maximum glass transition temperature, 62° C.

The 99.2 g of methyl methacrylate can be replaced with equally good results by a combination of 45 g of cyclohexyl methacrylate and 54.2 g of methyl methacrylate, or by a combination of 10 g of p-methylphenyl acrylate and 89.2 g of methyl methacrylate. Also, the 34.3 g of dimethylamino-2,2-dimethylpropyl-1-methacrylate can be replaced by the same amount of morpholinoethyl methacrylate. The reduced viscosities of these solutions range between 45 and 60 ml/g.

EXAMPLE 2

The same procedure is followed as in Example 1, except that a mixture of 99.2 g of methyl methacrylate, 80.0 g of butyl acrylate, 120.0 g of butyl methacrylate, 20.8 g of N-dimethylaminopropylmethacrylamide, 3.2 g of tert-butyl peroctoate, and 0.32 g of 2-mercaptoethanol is added. Solids content, about 40%; Brookfield viscosity, about 450 mPa.sec; reduced viscosity in acetone, about 32 ml/g; maximum glass transition temperature, 65° C.

EXAMPLE 3

420 g of ethyl acetate (degassed with 4 g of dry ice) are introduced into a Witt jar equipped with a horseshoe agitator with scraper blades, a thermometer, and a reflux condenser, and are heated. At 77° C., 2.75 g of azobisisobutyronitrile in 10 g of ethyl acetate are added and the addition of a mixture of 254.1 g of methyl acrylate, 254.1 g of vinyl acetate, 41.8 g of 3-dimethylamino-2, 2-dimethylpropyl-1 methacrylate, 2.75 g of 2,2-azobisisobutyronitrile, and 1.1 g of mercaptoethanol is started. This addition is made over about 2 hours. On completion of the addition, and again 2 hours later, another 2.75 g of 2,2-azobisisobutyronitrile in 10 g ether acetate are added each time. The base temperature is then maintained at 80° C. for another 8 hours. A clear, yellowish solution is obtained. Solids content, about 55%; Brookfield viscosity, about 900 mPa.sec; reduced viscosity in acetone, about 23 ml/g; maximum glass-transition temperature, 55° C.

Similar results are obtained using 54.1 g of vinyl propionate and 200 g of vinyl acetate instead of 254.1 g of vinyl acetate.

Application tests

(1) Preparation of a penetrating primer

The polymer described in Example 1 is diluted with ethyl acetate to a solids content of about 12 percent with stirring. If desired, pigment is added at this point, for example 0.05 percent by weight of Phthalocyanine Blue (Color Index Pigment Blue 15). The pigment is suitably mixed with a portion (at least 10 percent) of the primer solution and dispersed by ball milling. This mixture is subsequently stirred into the remaining solution.

This solution is applied to the substrate at a rate of 50–100 g/m².

(2) Test for early water resistance

Bricks are precoated with the penetrating primer referred to under (1) in such a way that no continuous coating film forms on the surface, in other words that practically all of the liquid is absorbed. The bricks so pretreated are dried overnight and then coated with a commercial stucco paint based on an aqueous acrylic resin dispersion. After a drying time of 24 hours, the bricks are placed in a water filled plastic pan in such a way that the coated top surface is not covered by the water and with the side opposite the coated side facing downward.

Even though maintained for several days under these conditions, the coating system described exhibits no coating defects such as loss of adhesion or bubble formation, for example.

Comparable results are obtained when the penetrating primer is prepared from the solution polymer described in Example 2.

Much the same is true when the solution polymer described in Example 3 is used. The results here, too, are better than those obtained with the product described in the following comparative example, although the early water resistance is not quite as good as that obtained with the systems described in Examples 1 and 2.

(3) Comparative example

When the procedure described under (2) is followed but a commercial copolymer based on vinyl acetate and dibutyl maleinate is used to prepare the penetrating primer, the coating is strewn with bubbles after just a few hours.

What is claimed is:

1. A method for priming an absorbent mineral or wood substrate to provide a wet-adhering coating, which method comprises applying to said substrate a solution, in an organic solvent having a normal boiling point between 50° C. and 180° C., comprising from 5 to 30 percent, by weight of the solution, of a copolymer consisting of (1) at least one monomer of the formula

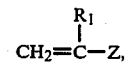

wherein $R_1$ is hydrogen or methyl and Z is

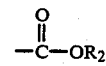

wherein $R_2$ is alkyl having from 1 to 10 carbon atoms or cycloalkyl having from 5 to 10 carbon atoms, or Z is phenyl or phenyl mono-, di-, or tri-substituted with alkyl having from 1 to 4 carbon atoms, or Z is

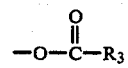

wherein $R_3$ is alkyl having from 1 to 8 carbon atoms; and (2) from 0.5 to 20 percent, by weight of the polymer, of at least one monomer of the formula

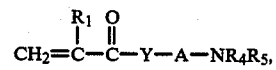

wherein $R_1$ is hydrogen or methyl, Y is oxygen or $-NR_6-$ wherein $R_6$ is hydrogen or alkyl having from 1 to 6 carbon atoms, A is aliphatic hydrocarbon having from 2 to 10 carbon atoms, and $R_4$ and $R_5$, taken alone, are independently alkyl having from 1 to 6 carbon atoms or, taken together with the nitrogen atom, are a five- or six-membered heterocyclic ring or such a ring containing further nitrogen or oxygen atoms, the maximum glass transition temperature of the copolymer being in the range from 20° C. to 80° C. and the reduced viscosity of the copolymer being in the range from 20 to 60 ml/g.

2. A method as in claim 1 wherein said solution additionally comprises a pigment or dye in an amount up to 15 percent by weight thereof.

3. A method as in claim 1 wherein said monomers (1) are methyl methacrylate and butyl acrylate.

4. A method as in claim 1 wherein said monomers (1) are methyl methacrylate, butyl acrylate, and butyl methacrylate.

5. A method as in claim 1 wherein said monomer (2) is a dialkylaminoalkyl-acrylate or -methacrylate.

6. A method as in claim 3 wherein said monomer (2) is a dialkylaminoalkyl-acrylate or -methacrylate.

7. A method as in claim 4 wherein said monomer (2) is a dialkylaminoalkyl-acrylate or -methacrylate.

8. A method as in claim 1 wherein said monomer (2) is an N-dialkylamino-2,2-dimethylpropyl methacrylate.

9. A method as in claim 3 wherein said monomer (2) is an N-dialkylamino-2,2-dimethylpropyl methacrylate.

10. A method as in claim 4 wherein said monomer (2) is an N-dialkylamino-2,2-dimethylpropyl methacrylate.

11. A method as in claim 1 wherein said solution is applied to said substrate at a rate from 2 to 15 g of polymer per square meter of substrate.

12. A method as in claim 1 wherein said monomer (1) is butyl methacrylate and said monomer (2) is 3-dimethylamino-2,2-dimethylpropyl methacrylate.

* * * * *